United States Patent [19]

Callis

[11] Patent Number: 4,477,114

[45] Date of Patent: Oct. 16, 1984

[54] ADJUSTABLE RAKE HEAD AND IMPROVED HANDLE SUPPORT

[76] Inventor: Howard F. Callis, Box 715, Mathews, Va. 23109

[21] Appl. No.: 493,829

[22] Filed: May 12, 1983

[51] Int. Cl.³ .............................................. A01B 1/20
[52] U.S. Cl. .................................. 294/50.6; 294/1 R; 294/50.8; 56/400.12
[58] Field of Search ...................... 294/50.6, 50.8, 53.5, 294/50.9, 55, 51, 52, 11, 16, 19 R, 103, 104, 106, 1 R; 15/104.8, 221, 257.7; 56/400.04, 400.12, 400.11

[56] References Cited

U.S. PATENT DOCUMENTS

| | | | |
|---|---|---|---|
| 2,546,113 | 3/1951 | Spang | 294/1 R |
| 2,908,131 | 10/1959 | Ross | 56/400.04 |
| 3,234,720 | 2/1966 | Blodgett | 56/400.05 |
| 3,809,421 | 5/1974 | James | 56/400.12 |
| 3,833,250 | 9/1974 | Lawrence | 294/50.6 |
| 4,037,397 | 7/1977 | Fiorentio | 56/400.12 |
| 4,057,277 | 11/1977 | Burkeholder | 294/50.8 |
| 4,185,448 | 1/1980 | Blanco | 56/400.12 |
| 4,292,794 | 10/1981 | Gascon | 56/400.12 |

Primary Examiner—James B. Marbert
Attorney, Agent, or Firm—Littlepage & Webner

[57] ABSTRACT

A system for gathering and transporting debris from a surface including first and second rakes having an adjustable head relative to the handle of the rake and a strap on a topmost portion of each rake handle adapted to attach to forearms of the user and handgrips disposed below the straps on each of the rakes for grasping by the hands of the user, each rake adapted to be operatively associated with one of two hands of the user and used in concert so that the rakes can be used to put debris between the two rake heads and be lifted up.

2 Claims, 5 Drawing Figures

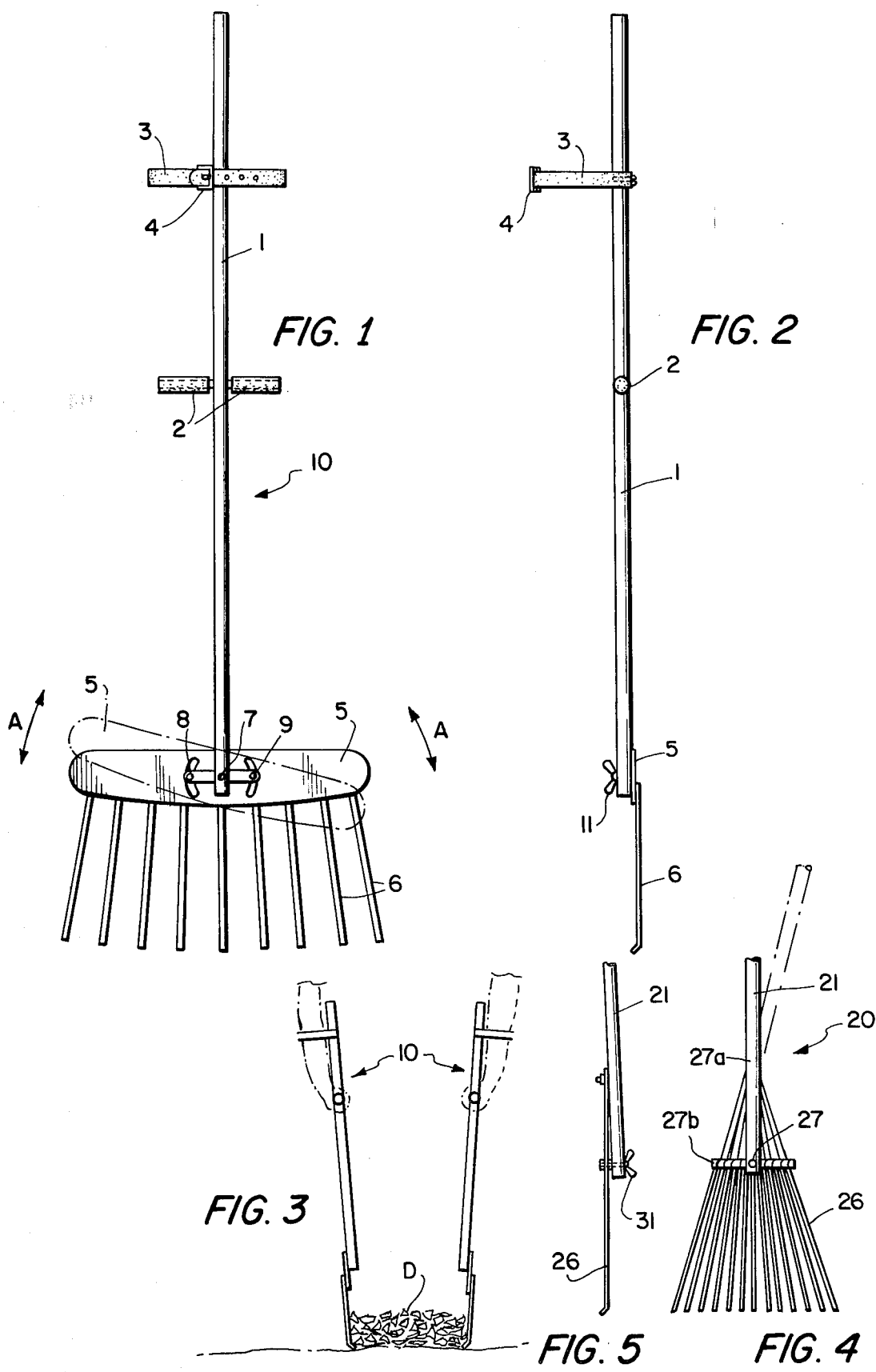

ADJUSTABLE RAKE HEAD AND IMPROVED HANDLE SUPPORT

BACKGROUND OF THE INVENTION

The following invention relates generally to rakes having heads which are adjustable relative to an associated handle and further includes an improved means for grasping the rake handle.

Maintenance of one's property has always been a time consuming and onerous task. Among the chores associated with lawn and garden maintenance, there are included raking and picking up of leaves, grass clippings, small limbs, etc., the gathering of which has been traditionally resolved by rakes. However, the placement of the debris to a location remote from the thus assembled piles requires stooping over and picking up the debris with one or more rakes and placing same into a container for transport to the remote location.

When the above described chore occurs relatively infrequently, one's muscles may not be necessarily conditioned to performing the task, and soreness can occur. Thus, a longstanding yet heretofore unsatisfied need exists for the facile gathering and placement of leaves, cut grass and other lawn debris from gathered piles to a location remote therefrom.

The following patents reflect to the state of the art of which applicant is aware in so far as these patents appear to be germane to the patent process:

U.S. Pat. No. 2,908,131—Ross—Oct. 13, 1959
U.S. Pat. No. 3,234,720—Blodgett—Feb. 15, 1966
U.S. Pat. No. 4,037,397—Fiorentino—July 26, 1977
U.S. Pat. No. 4,057,277—Burkholder—Nov. 8, 1977
U.S. Pat. No. 4,185,448—Blanco—Jan. 29, 1980
U.S. Pat. No. 4,292,794—Gascon—Oct. 6, 1981

Each of the citations except Blodgett teaches the use of a device for picking up trash and other debris in which first and second rake-like implements are pivoted to each other and includes means for allowing the two rake portions to articulate in allowing same to sandwich debris, trash or the like.

For example, the patent to Fiorentino teaches the use of first and second rakes pivoted at 32 and provided with handle members 35 and 44 (FIG. 1) to substantially achieve a structure which engages debris on two sides thereof for transport to an area remote therefrom.

Likewise, the patent to Ross has two rakes pivoted close to the base or head area of the rake so as to define a pair of tongs.

The patent to Blanco provides a combination rake and trash pickup tool in which the rakes are fanned from an open to a closed position by means of a linkage attached to the main handle 11 and a lever 29.

The remaining citations show the state of the art further.

By way of contrast, the instant invention and associated application is directed to and claims an instrumentality formed from two separate, discrete and non-interconnected rake components, each of substantially identical configuration provided with an instrumentality to attach each rake to one's arms at two separate points for ease and comfort in use. Moreover, an instrumentality has been provided on each of the thus defined rakes for angulating the head or working end of the rake relative to the shaft which extends to the arms of the user so that a variable and adjustable angle of attack can be effected when addressing debris to be picked up. The two rake instrumentalities are used in concert to provide a sandwiching effect so that debris between the two working heads can be picked up and debris can be deposited in an associated device which can transport the debris to a location remote from the lawn. Each rake can also function in the intended primary purpose as a rake without modification, unlike the prior art.

OBJECTS AND SUMMARY OF THE INVENTION

The instant invention, therefor, has as its primary objective the provision of an improved long reach hand rake head which is capable of angulation between the handle and the rake for ease in use.

A further object of this invention contemplates providing a device as characterized above in which an improved means for removabley attaching the rake handles to the user has been provided for the associated improved characteristics of utilization.

A further object of this invention contemplates providing a device as characterized above which is relatively inexpensive to manufacture and lends itself to mass production techniques.

A further object of this invention contemplates providing a device as characterized above which is adapated to be formed from components commercially available and is durable in construction and safe to use.

A further object of this invention contemplates providing a device as characterized above which obviates the necessity of having the user of the device bend over thereby minimizing unwanted stresses on the body of the user.

A further object of this invention contemplates providing a device as characterized above in which two such devices operating in concert allow debris to be picked up with the greatest of ease, but each device can be utilized separately for conventional raking.

These and other objects will be made manifest when considering the following detailed specification when taken in conjunction with the appended drawing figures wherein there has been provided a means for attaching each rake to one associated arm of the user, a means for orienting the working head of the rake relative to the handle which is attached to the user whereby manipulation of two such devices in concert allows debris disposed upon a lawn or the like to be sandwiched between the two working heads of the rake and elevated to be placed in a container or similar instrumentality to be transported to an area remote therefrom.

BRIEF DESCRIPTION OF THE DRAWINGS

FIG. 1 is a side view of one form of the invention.
FIG. 2 is an end view thereof.
FIG. 3 shows the device of FIGS. 1 and 2 used in concert.
FIG. 4 is a side view of a further form of rake.
FIG. 5 is an end view of that which is shown in FIG. 4.

BRIEF DESCRIPTION OF THE PREFERRED EMBODIMENT

Referring the drawings now wherein like reference numerals refer to like parts throughout the various drawing figures, reference numeral 10 is directed to a rake according to the first form of the invention, and reference numeral 20 is directed to a second form of rake having a different working head.

More particularly, the rake 10 of FIGS. 1 through 3 is provided with a handle 1 of elongate cylindrical configuration having at a lowermost terminus, an attachment to a rake head 5, the rake head 5 defined as a horizontally extending plate a lower edge of which is provided with a plurality of downwardly depending tines 6. The head 5 is provided at a centralmost area with a pivot pin 7 connecting the handle 1 to the transverse rake head 5, a wing nut 11 disposed at one extremity of the pivot pin 7 to thereby tighten the handle in a rotational relationship relative to the rake head 5 as shown by the ability of the rake to angulate in the direction of the arrows A and illustrated by having the rake head provided in phantom of FIG. 1 whereby the angle of attack of the tines 6 relative to the ground can be adjusted, or alternatively, the angulation of the handle from a vertical plane as suggested in FIG. 4 can be effected.

It is contemplated in one form of the invention that for additional support the handle 1 at its lowermost extremity be provided with integrally formed flanges 8 which in concert with the pivot pin 7 allow further bolts 9 to pass through the transverse rake head 5 for additional support. The support is therefor provided by the coaction of the flanges 8 in cooperation with the transverse rake head 5 and the handle 1 in its engagement with the pivot pin 7 whereby a wider area of interconnection has been provided so that once the relationship of the rake head to the handle has been effected, a further reinforced interconnection will have been made manifest. It should be apparent however that the flange 8 and the associated bolts 9 are optional accessories when the rigors of the job demand a greater supporting relationship between the rake head and the handle.

A medial portion of the handle 1 is provided with first and second transverse hand grip members 2 which pass through and are fastened to the handle 1, the transverse hand grips 2 provided with an outer membrane of rubber or the like so that callousities are not likely to occur on one's hand when using the device. An upper portion of the handle shaft 1 is provided with a strap 3 fastened to the handle 1 on a peripheral face of the handle 1, ninety degrees offset from the handgrips 2, the strap 3 is adapted to be looped around the shaft 1 and provided with an adjustable buckled end on termini of the strap 3 so that the effective length of the strap 3 can be altered. The strap 3 is adapted to gird the forearm of the user for additional mechanical advantage in manipulating the device 10. The uppermost extremity of the shaft 1 is allowed to abut against upper portions of the arm for additional mechanical advantage.

FIGS. 4 and 5 show a further form of the rake head as contrasted with FIG. 1. More particularly, the two types of tines contrasted in FIGS. 1 and 4 respectively may be described as follows. The elongate transversely disposed rectangular rake heads 5 has a plurality of tines extending downwardly and in substantially parallel relationship one to the other thereby providing a rake having relatively large spaces between adjacent tines. In FIG. 4, all of the rake tines 26 coincide at an uppermost point 27a where they are suitably fastened, and a transverse interbracing member 26b is provided down from the center point 27a. More particularly, the tines 26 act as radii emanating from the central point 27a. The reinforcing interbracing member 27b can connect with an associated handle 21 in the following manner.

In one form, the handle 21 is connected by pivot pin 27 to the transverse reinforcement 27b so that angulation of the device about the pivot point 27 is provided and a certain amount of support can be derived by the abutment of the handle 21 against portions of the tines 26 above the transverse reinforcing member 27b.

In another form of the invention, the center 27a of the tines 26 can be the fastening point to the handle 21 so that rotation of the handle 21 about the pivot point 27a causes the end of the handle 21 adjacent the reinforcing member 27b to abut thereagainst in movable relationship and provide an arm which in effect engages the reinforcing member 27b for additional support. Thus, in the first example of FIG. 4, the handle 21 derives some support from the tines which extend above and beyond the reinforcing member 27b, and in the second form, it is the free end of a lowermost portion of the handle 21 which abuts against portions of the tines below 27a and against the reinforcing member 27b which provides additional support. The upper end of the handle 21 is the same as that which is shown in the embodiments of FIGS. 1 and 2.

In use and operation, two rakes are adapted to be used and oriented for gathering so that they are mirror images of one another with the handle 1 or 21 angulated from a vertical plane as shown in the drawing figures. By suitable tightening of the pivots and the associated wing nuts 11,31 and in some instances the reinforcing bolts 9, the angle of the handle relative to the tines and the tines supports can be permanently effected. Once the strap member 3 is looped over each arm of the user (FIG. 3) and the handgrip portions 2 are appropriately engaged whereby a portion of the hand is adapted to grasp either or both of the handgrips 2, work can be done by staddling debris D (FIG. 3) with the rakes on either side thereof, thereby sandwiching the debris D therebetween and applying pressure to the two rakes will allow the debris to be picked up and placed into a container (not shown) for transport to another area. It is well known that grass clippings, leaves, sticks, and the like, if left on the lawn will have an adverse effect on the future growth of the lawn.

Having thus described the preferred embodiments of the invention, it should be understood that numerous structural modifications and adaptations may be resorted to without departing from the spirit of the invention.

What is claimed is:

1. A system for gathering and removing debris from a ground surface comprising in combination:
   first and second rake means each comprised of an elongate handle,
   a rake head,
   a plurality of tines having inner end portion secured to said rake head and free end portions extending generally in one direction away from said rake head,
   means for attaching the rake head to one end of the handle,
   and strap means comprised of a closed loop for engaging around the forearm of a user, said strap means being attached to said handle adjacent the other end thereof,
   said system being characterized in that said rake means are free of and unattached to and freely moveable with respect to one another,
   the means for attaching the rake head to said one end of said handle comprising pivot means connecting said handle and rake head for rotational adjustment about an axis disposed transversely to the lengths of said handle and rake head.

2. A rake comprising an elongate handle, a rake head, means for attaching said rake head to one of said handle, a plurality of tines having inner end portions secured to said rake head and free end portions extending generally in one direction away from said rake head, and strap means forming a closed loop attached to said handle adjacent the other end thereof for engaging around the forearm of the user, said rake head comprising an elongate plate, the means for attaching the rake head to said one end of said handle comprising pivot means connecting said handle and plate for rotational adjustment about an axis disposed transversely to the lengths of said handle and plate.

* * * * *

UNITED STATES PATENT AND TRADEMARK OFFICE
CERTIFICATE OF CORRECTION

PATENT NO. : 4,477,114

DATED : October 16, 1984

INVENTOR(S) : Howard F. Callis

It is certified that error appears in the above-identified patent and that said Letters Patent is hereby corrected as shown below:

Claim 2, column 5, line 7.

Please insert "end" after --one--.

Signed and Sealed this

Thirtieth Day of April 1985

[SEAL]

Attest:

DONALD J. QUIGG

Attesting Officer  Acting Commissioner of Patents and Trademarks